Patented Nov. 28, 1922.

1,436,683

UNITED STATES PATENT OFFICE.

ARTHUR F. ROSE, OF NEW BRIGHTON, NEW YORK, ASSIGNOR TO AMERICAN TELEPHONE AND TELEGRAPH COMPANY, A CORPORATION OF NEW YORK.

BATTERY SUPPLY CIRCUITS FOR REPEATERS.

Application filed February 28, 1918. Serial No. 219,585.

*To all whom it may concern:*

Be it known that I, ARTHUR F. ROSE, residing at 17 St. Marks Place, New Brighton, Staten Island, in the county of Richmond and State of New York, have invented certain Improvements in Battery Supply Circuits for Repeaters, of which the following is a specification.

This invention relates to telephone circuits and more particularly to battery supply circuits for repeater installations involving a plurality of vacuum tube repeater elements.

In vacuum tube repeater installations it has heretofore been customary to provide a separate low voltage battery to heat the filament of each repeater element. Similarly a battery of higher potential was provided for each repeater element in order to supply the space current for the repeater element. In large installations this necessarily involved the provision of a large number of current supply sources. It is one of the objects of the present invention to provide a circuit arrangement whereby the filament heating current and space current of a plurality of tubes may be supplied from a common source. This object, as well as other objects of the invention may be accomplished by connecting the filaments of a plurality of tubes in series with a filament heating battery and as many additional such series combinations as may be desired in parallel, and by providing parallel connections from a common battery for the output circuits of a plurality of tubes. Since the filaments are connected in series, the potential drop between the plate and filament will be different for different tubes, and to compensate for this difference, space current connections of different resistances have been provided.

Figure 1:
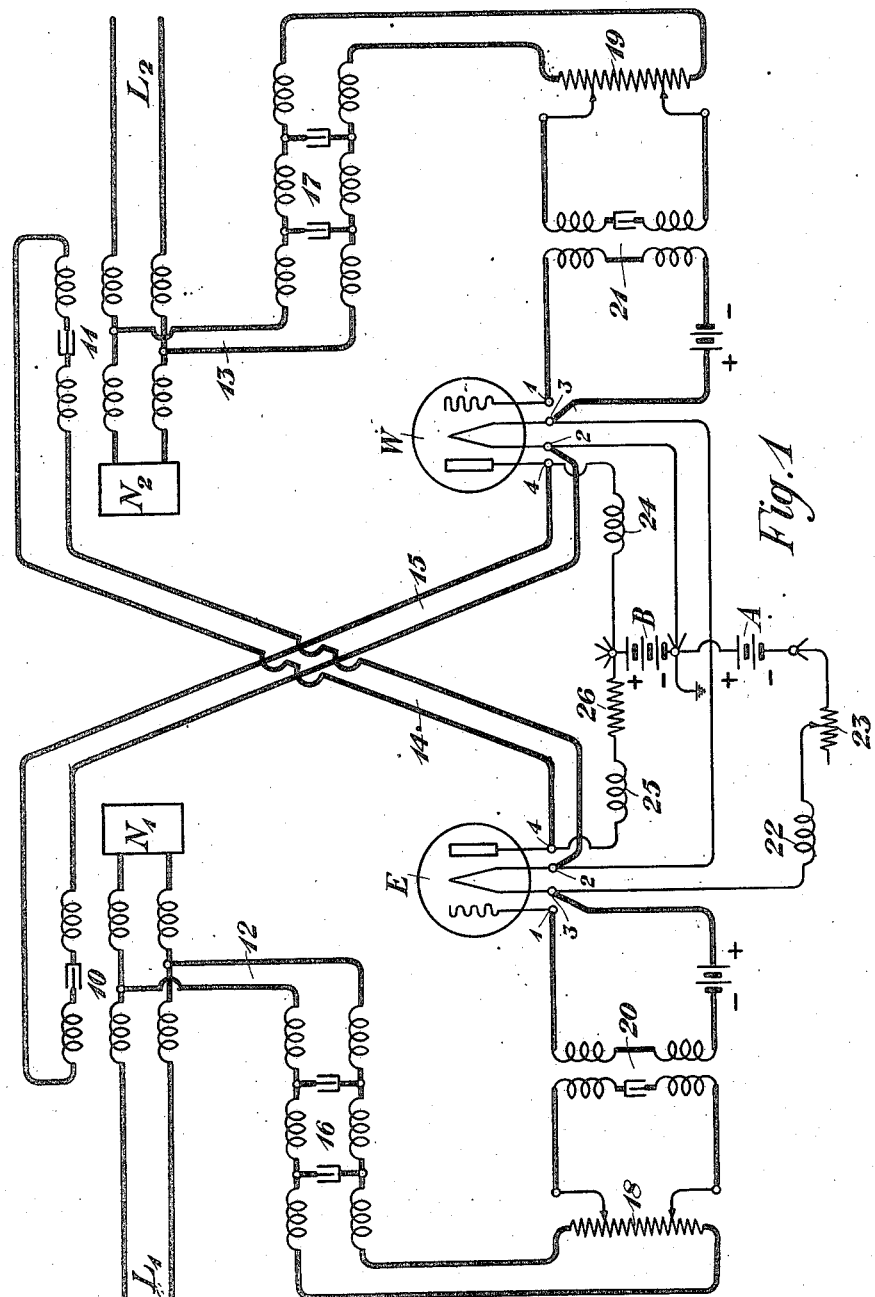
Figure 2:
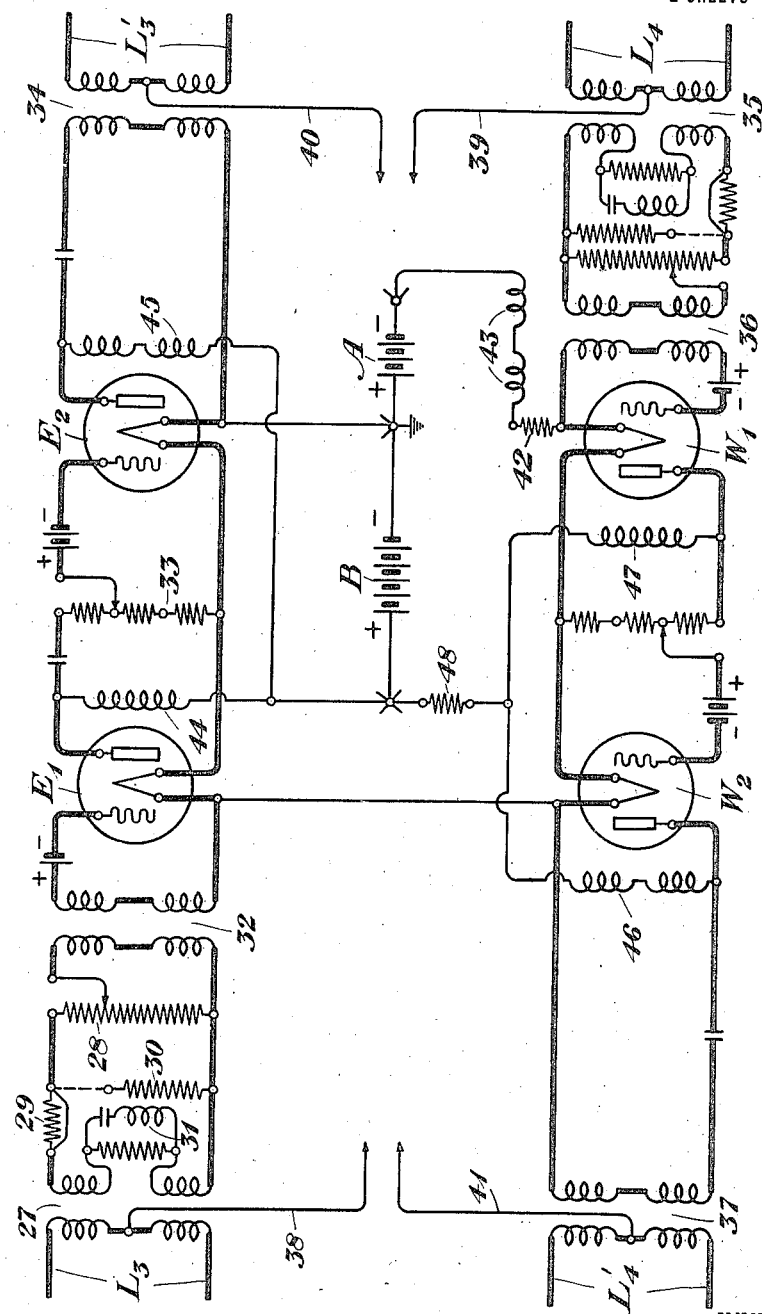

The invention will be more fully understood from the following detailed description when read in connection with the accompanying drawing, Figure 1 of which constitutes a circuit diagram of the invention as applied to a two-way two-repeater circuit and Figure 2 of which is a circuit diagram of the invention as applied to a repeater station of a four-wire transmission circuit.

Referring to Figure 1, lines $L_1$ and $L_2$ are shown interconnected through a two-way two-repeater circuit comprising the balancing artificial lines or networks $N_1$ and $N_2$, the three coil transformers 10 and 11, input bridges 12 and 13, repeater elements E and W and output circuits 14 and 15. The input bridges 12 and 13 include filters 16 and 17 and are associated with the grid circuits of the repeaters E and W through potentiometers 18 and 19 and through transformers 20 and 21 respectively. The transformers 20 and 21 are preferably step up transformers and the potentiometers 18 and 19 are arranged on the low side of the transformers instead of the high side as in the usual repeater arrangement.

The filaments of the two-repeater elements E and W are included in a series circuit with a source of filament heating current A, which may be of 24 volts (one terminal of which may be grounded), a retardation coil 22 and a regulating resistance 23. Other such series combinations may if desired be connected across the terminals of the source A.

A second source of current, B, of higher potential than the source A is provided for the purpose of supplying the space current for the tubes. The negative terminal of the source B is preferably connected to the positive terminal of the source A while the positive terminal of said source B is connected to the plate of the repeater element W through a retardation coil 24 and to the plate of the repeater element E through a retardation coil 25 and a resistance 26. The resistance 26 is provided in order to equalize the difference in the potential drops between the plates and filaments of the two-repeater elements due to the series connection of the filaments. The necessity for this arrangement will be seen from the following considerations:

Assuming that the potential drop across each of the serially connected filaments is 6 volts and, neglecting the resistance of the retardation coils 24 and 25, and if the resistance 26 be omitted, the potential drop between the plate terminal 4 of the tube W and the terminal 2 of the filament of said tube will be equal to the voltage of the battery B, say for example 130 volts. Between terminals 4 and 3 of the tube W there is an additional drop of 6 volts, making a total of 136 volts, or an average drop between the plate and filament of 133 volts. On the other hand the terminal 2 of the tube E, since it is directly connected to the terminal 3 of the repeater W, is 6 volts lower than the terminal 2 of the repeater W, so that the total drop between terminals 4 and 2 of repeater E is 130 plus 6 or 136 volts and, since there is a drop of 6 volts between the terminals 2 and 3 of the tube E, the total drop between terminals 4 and 3 of said tube will be 142 volts, so that the average potential drop between the plate and filament of the tube E is 139 volts. By inserting a resistance 26 in the plate circuit of the tube E of sufficient value this average difference in potential drop between the plates and filaments of the two tubes may be compensated for.

A modified form of the invention is shown in Figure 2 which illustrates the invention as applied to a repeater station of a four-wire transmission circuit. In four-wire transmission circuits, as is well known, terminating two-wire lines are interconnected through induction coils to a four-wire system comprising two separate transmission circuits, one for transmission in one direction and the other for transmission in the opposite direction, one-way repeaters being included in each of the two transmission circuits in order to secure the desired transmission equivalent for the system. In Figure 2 the entire four-wire system is not illustrated, as it is well known in the art, and only the features pertaining to the one-way repeaters included in the two transmission lines of the four-wire circuit are shown. The line for transmission in one direction is divided into two sections $L_3$ and $L_3'$ said sections being interconnected through a one-way repeater arrangement comprising vacuum tubes $E_1$ and $E_2$. In the same manner the line for transmission in the opposite direction is divided into two sections $L_4$ and $L_4'$, said sections being interconnected through a one-way repeater arrangement comprising vacuum tubes $W_1$ and $W_2$. The line section $L_3$ is connected through a simplex or phantom coil 27, to an intermediate circuit including a potentiometer 28, a series impedance 29 and a shunt impedance 30. The secondary of the simplex coil 27 may be divided and a network 31 serially included therein, said network comprising two branches, one consisting of a simple resistance and the other of an inductance and capacity in series. The series resistance in the intermediate circuit may be normally shortcircuited and the shunt resistance normally disconnected as indicated in dotted lines, said resistances being actually included in the circuit when it is desired to increase the transmission equivalent of the circuit by some arbitrary amount.

The intermediate circuit is connected to the grid circuit of the vacuum tube $E_1$ through a step up transformer 32. The tubes $E_1$ and $E_2$ are connected in tandem, with a potentiometer 33 between the two tubes and the output or plate circuit of the tube $E_2$ is associated with the line section $L_3'$ through a transformer 34. The potentiometers 28 and 33 are for the purpose of regulating the gain due to the repeater organization comprising the vacuum tube elements $E_1$ and $E_2$, the potentiometer 33 being adjustable by large steps and the potentiometer 28 being adjustable by small steps.

The line section $L_4$ of the other transmission circuit is connected through a simplex or phantom coil 35 to an intermediate circuit similar to that above described, said intermediate circuit being connected to the grid circuit of the vacuum tube element $W_1$ by a step up transformer 36. The vacuum tube element $W_1$ is connected in tandem with the element $W_2$, the output or plate circuit of which is connected to the line section $L_4'$ by means of a step down transformer 37.

Leads 38 and 39 may be connected to the mid-points of the primaries of simplex or phantom coils 27 and 35 and leads 40 and 41 connected to the mid-points of the secondaries of transformers 34 and 37, so that a phantom telephone circuit may be provided if desired, or the line sections used for Morse or other signaling purposes in addition to their use as the two sides of a four-wire circuit.

The filaments of the tubes $E_2$ and $E_1$, $W_2$ and $W_1$ are all connected in series through a regulating resistance 42 and an inductance 43 to the negative terminal of the filament heating battery A, which may be of 24 volts and the positive terminal of which may be grounded as shown. Other such series combinations may if desired be connected across the terminals of this battery.

A second source B, which may be of 130 volts, is provided for the purpose of supplying the space current of the four tubes, the negative terminal of said source being preferably connected to the positive side of the source A. The plates of the tubes $E_1$ and $E_2$ are connected in parallel through impedance coils 44 and 45 respectively, to the positive side of the source B. The plates of the tubes $W_1$ and $W_2$ are connected in parallel through impedance coils 47 and 46 respectively, to one terminal of a resistance 48 the opposite terminal of which is connected to the positive side of the source B. The purpose of the resistance 48 is to equalize the potential drops between the plates and filaments of the pairs of tubes in the two transmission circuits so that the same gain will result in each cricuit; thus the drop across the tube $E_1$ will be equal to that across the tube $W_1$ while the drop across the tube $E_2$ will be equal to that across the tube $W_2$.

There is a difference between the potential drops across the tubes $E_1$ and $E_2$ as well as between the drops across tubes $W_1$ and $W_2$ which is not compensated for; however it is not essential that tubes $E_1$ and $E_2$ or $W_1$ and $W_2$ produce the same gain, the resistance 48 merely insuring that the two sides of the repeater circuit are alike. It would, of course, be possible by including separate resistances of proper values in each of the plate connections to produce the same potential drop across each of the four tubes, but in practice this is found to be an unnecessary refinement.

It will be obvious that the general principles hereinbefore disclosed may be embodied in many organizations widely different from those illustrated without departing from the spirit of the invention as defined in the following claims.

What is claimed is:

1. In a repeater system, a plurality of vacuum tube repeater elements each including a filament and a plate, a source of filament heating current, the filaments of a plurality of tubes being connected in series circuit with said source, a source of space current, fixed parallel connections from said source to the filament and plate of a plurality of tubes, and means in certain of said parallel connections having such characteristics that the difference in potential drops across the plates and filaments of different tubes due to the series connections of the filaments is equalized.

2. In a repeater system, a plurality of vacuum tube repeater elements each including a filament and a plate, a source of filament heating current, the filaments of a plurality of tubes being connected in series circuit with said source, a source of space current, parallel connections from said source to the filament and plate of a plurality of tubes, and resistance in certain of said parallel connections so proportioned as to compensate for the difference in potential drops across the plates and filaments of different tubes due to the series connections of the filaments.

3. In a repeater system, a pair of vacuum tube repeater elements each including a filament and a plate, a source of filament heating current, the filaments of said tubes being connected in series circuit with said source, a source of space current, parallel connections from one terminal of said source to plates of each of said tubes, connections from the other terminal of said source to the filaments of said tubes, and a resistance element in one of said plate connections so proportioned as to compensate for the difference in the potential drops across the filaments and plates of the two tubes due to the series connections of the filaments.

4. In a repeater system, two pairs of vacuum tube repeater elements, each tube including a filament and a plate, a source of filament heating current, the filaments of said tubes being connected in series circuit with said source, a source of space current, connections from one terminal of said source to said filaments, parallel connections from the plates of one pair of tubes to the other terminal of said source, and parallel connections including resistance from the plates of the other pair of tubes to said last mentioned terminal, said resistance being of such value as to compensate for the differences in the potential drops across the filaments and plates of the two pair of tubes due to the series connections of the filaments.

In testimony whereof, I have signed my name to this specification this twenty fifth day of February, 1918.

ARTHUR F. ROSE.